United States Patent [19]

Chesna et al.

[11] Patent Number: 5,427,731
[45] Date of Patent: Jun. 27, 1995

[54] COMPRESSION MOLDING OF STRUCTURES

[75] Inventors: John C. Chesna, North Royalton, Ohio; Wayne F. Gentile, Newark, Del.; Subhotosh Khan, Wilmington, Del.; William H. Krueger, Wilmington, Del.

[73] Assignee: E.I. du Pont de Nemours and Company, Wilmington, Del.

[21] Appl. No.: 186,089

[22] Filed: Jan. 25, 1994

Related U.S. Application Data

[63] Continuation-in-part of Ser. No. 10,570, Jan. 28, 1993, abandoned.

[51] Int. Cl.⁶ .............................................. B29C 43/52
[52] U.S. Cl. ................................. 264/327; 264/331.14
[58] Field of Search ............... 264/40.6, 127, 257, 264/258, 322, 327, 331.14

[56] References Cited

U.S. PATENT DOCUMENTS

| | | | |
|---|---|---|---|
| 2,215,733 | 9/1940 | Gibb et al. | 264/327 |
| 2,505,807 | 5/1950 | Stott | 264/327 |
| 2,911,678 | 11/1959 | Brunfeldt | 264/327 |
| 3,119,148 | 1/1964 | Chambus et al. | 264/327 |
| 4,163,742 | 8/1979 | Mansure | 523/220 |
| 4,874,564 | 10/1989 | Sudani et al. | 264/24.7 |
| 4,963,312 | 10/1990 | Müller | 264/327 |
| 4,975,321 | 12/1990 | Gentile et al. | 428/294 |
| 5,032,339 | 7/1991 | Farraye-Callahan et al. | 264/235 |
| 5,047,198 | 9/1991 | Kim | 264/257 |
| 5,055,025 | 10/1991 | Müller | 425/144 |
| 5,108,672 | 4/1992 | Sasaki et al. | 264/40.5 |
| 5,232,975 | 8/1993 | Deakyne | 264/321 |

FOREIGN PATENT DOCUMENTS 792352  3/1958  United Kingdom ................ 264/327

*Primary Examiner*—Jay H. Woo
*Assistant Examiner*—Robert B. Davis

[57] ABSTRACT

A process for compression molding a fiber reinforced thermoplastic resin article that includes subjecting the fiber reinforced resin material to heat and pressure to form the article, then directionally cooling the mold sequentially from bottom to top to provide a thermal gradient suitable for creating directional solidification of the material.

4 Claims, 1 Drawing Sheet

COMPRESSION MOLDING OF STRUCTURES

This is a continuation-in-part of application Ser. No. 08/010,570 filed Jan. 28, 1993 and now abandoned.

BACKGROUND OF THE INVENTION

The invention relates to compression molded structures and, in particular, it relates to a method of compression molding such structures by directional cooling the material being molded.

In usual forming operations, a relatively standard cycle occurs. The system is heated to the melt, compressed to shape and then cooled, frequently at a leisurely pace. Since cooling is at the face, freezing/crystallization occurs there first, while the bulk of the matrix resin is still liquid. As cooling continues, the crystallization front moves inward with concomitant shrinkage. This, in combination with the interfacial strain, imposes large stresses on the already crystallized material. For crystalline polymers with high elongation, the stress can be accommodated. For crystalline polymers which have low elongations to break, this can impose stresses leading to failure (flaw formation) or a state where relatively small additional strains can lead to failure. The effects can be quite significant in thick cross sections and show up as lowered strength and toughness.

Nairn and Zoller discussed the effects of matrix crystallization in composites (JJA Nairn and P. Zoller, V International Conference on Composite Materials ICCMV and J Matl. Science, 1985 (20)). The analysis centered on the large dimensional changes involved in cooling semicrystalline matrices from high temperature melts to room temperature and the associated strains imposed by shrinkage and constraint of reinforcing fibers. Nairn measured the strain optically on an amorphous matrix resin where the retardation at the fiber matrix interface could be followed, and the results showed substantial stress build-up at the interfaces.

The conclusion was that thermoplastic materials, with a large temperature difference between forming temperature and room temperature, will show substantial internal strain. When crystallization of the matrix is superimposed in a heat-crystallize-cool cycle, resulting strain levels may be above those the matrix can tolerate and result in actual fracture of the sample. It is clearly important to minimize the strain effects on temperature cycling discussed by Zoller and Nairn.

One way to minimize the strain effects on temperature cycling of polymers is disclosed in U.S. Pat. No. 5,032,339 wherein a fiber reinforced thermoplastic material is subjected to heat and pressure to for a molded article, then the molded article is subjected to a predetermined quenching cycle that centralizes void location in the molded article.

SUMMARY OF THE INVENTION

The process of this invention involves making a molded article of a thermoplastic resin or a fiber reinforced thermoplastic resin material by forming the article in the cavity of a mold shaped to conform to the article wherein the fiber has a higher melting point than the resin. The mold has a plurality of zones capable of being individually heated arranged from top to bottom of the mold and a means to apply pressure from the top of the mold to the material within the mold. The steps of the process comprise: filling the cavity of said mold with either thermoplastic resin material or fiber reinforced resin material; heating each of said zones to a first temperature sufficient to melt said thermoplastic resin but insufficient to degrade said resin; consolidating said material in said mold by applying a predetermined pressure thereto; reducing said first temperature in each of said zones in sequence from the bottom to the top of said mold to a second temperature of from about 20° F. to about 180° F. (10° C. to about 100° C.) below the melt temperature of said resin sequentially from bottom to top in each of said zones; and removing said article from said mold. The second temperature is reached by stopping the heating step in each zone after the temperature in the preceding zone reaches said second temperature. In a preferred embodiment the resin is a fluoropolymer resin and the fiber is carbon fiber.

An alternate process involves filling the cavity of the mold with thermoplastic resin material or fiber reinforced resin material, then heating the mold to melt the resin, applying a first pressure to the mold to expel trapped air and force debulking of the resin material. When processing temperature is reached (10° to 100° C. above the melting point of the resin) the pressure in the mold is reduced to the minimum available for the press (i.e. a second pressure) and this temperature/pressure condition held until thermal equilibrium is reached. The pressure is then revised to the first pressure and heating of the mold is stopped and the mold is cooled down under the first pressure.

DETAILED DESCRIPTION OF THE PREFERRED EMBODIMENT

Figure 1:
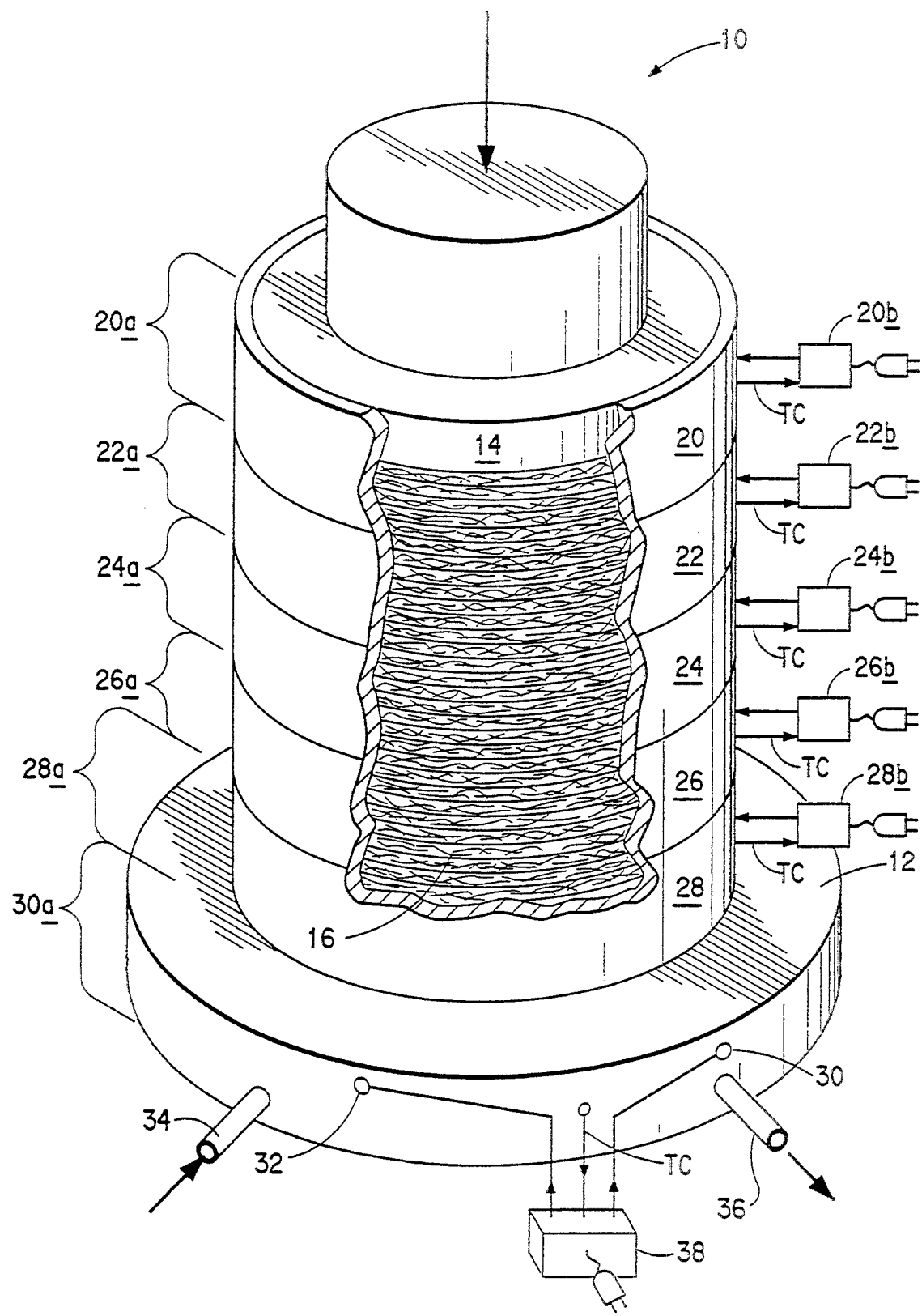
FIG. 1 is a perspective view of a mold, partially in section, constructed according to the method of this invention and arranged to have a composite article formed therein.

In the embodiment chosen for purposes of illustration a hollow cylindrical mold 10 is enclosed at its bottom by a base 12 and at its top by piston 14 fitted into the cylindrical mold 10 for applying pressure to a charge of fiber reinforced thermoplastic resin material 16 contained in the cavity of the mold. Electrical band heaters 20, 22, 24, 26 and 28 are wrapped around the periphery of mold 10 and respectively positioned adjacent each other from top to bottom of the mold. Each band heater encompasses respective heating zones 20a, 22a, 24a, 26a and 28a on the mold.

The base 12 contains two cartridge heaters 32, 34 which supply heat to the base heating zone 30a. The base is also provided with cooling channels through which cooling fluid may be circulated from the inlet 34 to the channels to the outlet 36 from the channels in the base. Each band heater is controlled by respective controllers (20b, 22b, 24b, 26b, 28b), each of which has an input from a thermocouple (T.C.). The base cartridge heaters are controlled by a controller 38 which has an input from a thermocouple (T.C.) in the base.

A thermocouple (TC) is positioned in the mold to sense the temperature of the material 16 in the mold cavity at each heating zone and at the base.

In operation a charge of fiber reinforced thermoplastic resin material 16 is placed in the cavity of mold 10. Each heater 20 to 28 is connected to a power source (not shown) and the material 16 in the mold is brought up to a first temperature which is the melt temperature of the thermoplastic resin. Pressure is applied to the material 16 in the cavity of the mold by piston 14 during the period that the resin is being melted. After a period of equilibration, directional cooling of the material from the bottom of the mold to the top of the mold takes place by turning off or reducing the power to the heater supplying each zone and allowing the temperature at the interface between zones to reach a second temperature of from about 20° F. to about 180° F. below the melt temperature of the resin which is sufficient to solidify the resin and then cutting off or controlling the heater in each zone in the same manner to reach the same result sequentially from bottom to top of the mold for each zone while pressure is maintained on the material in the mold.

While the mold chosen for purposes of illustration is shown in the upright position, it is to be understood that mold 10 could be laid on its side and the pressure by ram 14 could be applied from one end to the other and the directional cooling would take place from the end opposite the end to which pressure is applied.

Example 1

A mixture of 20% (by weight) carbon fiber (¼" long) and fluoropolymer pellets (Teflon® PFA by DuPont) are used to prepare a prepreg.

These prepregs were cut into 3'×3' (90 cm×90 cm) square pieces. Eight layers of these pieces; were laid in alternate directions (machine/cross directions) and were consolidated into sheets of thickness 0.100" (2.5 mm) through a press at 650° F. (343° C.) and 350 psi (2500 KPa) pressure for 20 minutes. Circular disks with diameter 1.480" (37.5 mm) were cut out of these sheets for placing in a mold.

The main part of the mold is a right circular hollow cylinder with an ID of 1.500" (38.1 mm), OD of 3" (76 mm) and 10" (25 cm) long. Preferred material of construction of the mold is AISI type H13 Tool steel. The cylinder is attached to the groove of a 1" (25 mm) thick (20 cm×20 cm) square metal plate (baseplate) through collar and pin arrangement.

There are two rod cartridge heaters (Warlow Cartridge #18A60-NC14, V-240, W-1000) in the baseplate with a thermocouple (ThermoElectric P/N JJ18U-304-00-12-0-0 L) centrally placed between those heaters. Three band heaters (Watlow Thinband #STB2N2J2-C14, V-240, W-650) were placed along the length of the cylinder with thermocouples. We had four "thermal management sections" in this mold. This assembly was now placed on top a press-table. The press (Enerpac, model #RR-1010 and PEM3405D) is capable of delivering up to 10,000 psi (70 MPa) line pressure under controlled conditions. The heaters and the thermocouples from each section were connected to their respective controllers (Microstar model #828-D00-101-101-120-66).

The mold was coated with mold release agent following common practice. A circular piece of Kapton® film (by DuPont) was placed in the mold cavity first. Then enough disks (400+5 gms) to make 6" (15 cm) long rod were placed into the mold cavity (making sure all the chips are laying flat). A circular piece of Kapton® film was placed on top of the last disk. The top of the mold was closed by the ram.

All the heaters were turned on at the same time. The set point at all the controllers were at 660° F. (349° C.). The mold was pressurized to 3200 psi (22 MPa). The heat-up period was 30 minutes. The material and the mold were held at that temperature and pressure for 30 minutes to reach thermal equilibrium.

During cooldown, the power to the base was reduced (through the controller) such that it started to cool at 5° F./minute (2.8° C./minute), maintaining 660° F. (349° C.) at other heating zones. After 32 minutes, the temperature at the base was 500° F. (260° C.). At this time the power for the zone adjacent the base was turned down so that this section cooled at 5° F./minute (2.8° C./minute). Thus, the base and first adjacent zone were cooling at 5° F./minute (2.8° C./minute) whereas the following zones were maintained at 660° F. (349° C.). After 32 minutes more, power input to the second zone adjacent the base was turned down to cool at a rate 5° F./minute (2.8° C./minute). When this section reached 500° F. (260° C.), after 32 minutes, all the power to the mold was turned off. Data was recorded for 20 minutes more when the average temperature of the mold reached 250° F. (121° C.). After the mold reached a temperature of 90° F. (32° C.), the composite rod was pushed out of the mold.

The rod was then tested for visual integrity and density. Test rods were cut into two parts along the vertical axis. The cut surfaces were polished following standard procedure of optical microscopy. No cracks/voids were visible upon examination at 25X using an optical microscope.

EXAMPLE 2

Same material as Example 1 is used except circular disks with diameter 8.02 inches (204 mm) were cut out of these sheets.

The main part of the mold is a right circular hollow cylinder with an ID of 8.225" (209 mm), OD of 9.5" (24 cm) and 10" (25 cm) long. Preferred material of construction of the mold is AISI type H13 Tool steel. The cylinder is attached to the groove of a 1.5" (38 mm) thick (305 mm diameter) circular metal plate (baseplate) through a welded flange and bolt.

There are four rod cartridge heaters (Warlow Cartridge #J8A60-NC14, V-240, W-1000) in the baseplate with a thermocouple centrally placed between those heaters. In addition, there are cooling channels in the baseplate through which air and/or water can be forced through to cool the plate faster. Four band heaters (Watlow Thinband C/N STB9J-2A1-C14, V-240, W-1800) were placed along the length of the cylinder with thermocouples. Another band heater was placed on the male part of the tool (ram-attached to the press). Six "thermal management" sections were in this mold. This assembly was now placed on top of a press-table. The press (P-H Hydraulic Model #4C-300T) is capable of delivering up to 300 tons (2.7•10$^6$ NT) of load under controlled conditions. The heaters and the thermocouples from each section were connected to their respective controllers (Microstar Model #828-C00-101-101-120-66).

The mold was coated with a mold release agent following common practice. A circular piece of Kapton® film by DuPont was placed in the mold cavity first. Then enough disks (7100 gms) to make 4" (10 cm) long disk was placed into the mold cavity. A circular piece of Kapton® film was placed on top of the last disk. The top of the mold was closed by the male part of the tool.

All the heaters were turned on at the same time. The set point at all the controllers were at 350° C. (662° F.). The mold was pressurized to 5000 psi (22 MPa). The heat up period was 1 hour (FIG. 3). As the average mold temperature reached 310° C. (590° F.), we reduced the pressure to 2000 psi (14 MPa). We held the material and the mold at that temperature for 2 hours for the thermal equilibrium. After that point the pressure was raised back to 5000 psi (22 MPa).

During cooldown, the power to base and air is forced through the cooling channels of the baseplate. After the temperature at section I reached 260° C. (500° F.), the power was turned off for first zone adjacent the base. Thus, at this point the base was being forced cool with air and the first zone adjacent the base was cooling ambiently, whereas the second and third zones adjacent the base were maintained at 350° C. (662° F.). When the temperature of the first zone adjacent the base became 260° C. (500° F.), power was disconnected from the second zone adjacent the base. As the temperature of the base approached 200° C. (392° F.), tap water was circulated in the channels in the base to enhance cooling from the bottom. When this second zone reached 260° C. (500° F.), power from the third zone adjacent the base was disconnected. The fourth zone adjacent the base started ambient cooling when the temperature in the third zone reached 260° C. (500° F.). After the mold reached a temperature of 30° C. (86° F.), the composite disk was pushed out of the mold.

The disk was then tested for visual integrity and density. Test disks were cut into two parts along the vertical axis. The cut surfaces were polished following standard procedure of optical microscopy. No cracks/voids were visible upon examination at 25X using an optical microscope.

The theoretical density of these disks are 2.07 gms/cc. Following ASTM D792 procedure, the density of the specimen was found to be 2,065 gms/cc. This value was within the expected error and variation range for a defect-free composite.

EXAMPLE 3

A mixture of 36% (by weight) carbon fiber (¼" long) and polyether ketone ketone (PEKK) pellets are used to prepare a prepreg.

These prepregs were cut into 3'×3' (90 cm×90 cm) square pieces. Eight layers of these pieces were laid in alternate directions (machine/cross directions) and were consolidated into sheets of thickness 0.100" (2.5 mm) through a press at 650° F. (343° C.) and 350 psi (2500 KPa) pressure for 20 minutes. Circular disks with diameter 1.480" (37.5 mm), were cut out of these sheets.

The main part of the mold is a right circular hollow cylinder with an ID of 1.500" (38.1 mm), OD of 3" (76 mm) and 10" (25 cm) long. Preferred material of construction of the mold is AISI type H13 Tool steel. The cylinder is attached to the groove of a 1" (25 mm) thick (20 cm×20 cm) square metal plate (baseplate) through collar and pin arrangement.

There are two rod cartridge heaters (Watlow Cartridge #J8A60-NC14,V-240,W-1000) in the baseplate with a thermocouple (ThermoElectric P/N JJ18U-304-00-12-0-0 L) centrally placed between those heaters. Three band heaters (Watlow Thinband #STB2N2J2-C14,V-240,W-650) were placed along the length of the cylinder with thermocouples. We had four "thermal management sections" in this mold. This assembly was now placed on top a press-table. The press (Enerpac, model #RR-1010 & PEM3405D) is capable of delivering up to 10,000 psi (70 MPa) line pressure under controlled conditions. The heaters and the thermocouples from each section were connected to their respective controllers (Microstar Model #828-D00-101-120-66).

The mold was coated with mold release agent following common practice. A circular piece of Kapton® film was placed in the mold cavity first. Then enough disks (250±5 gms—to fill the mold cavity) were placed into the mold cavity (making sure all the chips are laying flat). A circular piece of Kapton® film was placed on top of the last disk. The top of the mold was closed by the ram.

All the heaters were turned on at the same time. The set point at all the controllers were at 670° F. (355° C.). The mold was pressurized to 3200 psi (22 MPa). The heatup period 30 minutes. We held the material and the mold at that temperature and pressure for 30 minutes to reach thermal equilibrium.

During cooldown, the power to section I was turned off. After the temperature at section I reached 260° C. (500° F.), we turned the power for section II off. Thus at this point, section I and section II were cooling ambiently; whereas section III and IV were maintained at 355° C. (670° F.). When the temperature of section II became 260° C. (500° F.), we disconnected power from section III. When this section III reached 260° C. (500° F.), power from section IV was disconnected. After the mold reached a temperature of 30° C. (86° F.), the composite disk was pushed out of the mold.

The rod was then tested for visual integrity and density. Test rods were cut into two parts along the vertical axis. The cut surfaces were polished following standard procedure of optical microscopy. No cracks/voids were visible upon examination at 25X.

The theoretical density of these rods are 1.45 gms/cc. Following ASTM D792 procedure, the density of the specimen was found to be 1.41 gms/cc. This value was within the expected error and variation range for a defect free composite.

EXAMPLE 4

Fluoropolymer (Teflon® PFA by DuPont) resin, available in sheet form approximately 0.09" thick, was converted to 1 15/32" (37.3 mm) diameter disks. The mold tube is similar to that described in Example 1, with the following exceptions.

The main part of the mold is a right circular hollow cylinder with an ID of 1.500" (38.1 mm), OD of 3" (76 mm) and 10" (25 cm) long. The molds are constructed of AISI type A2 tool steel, with chromized surface treatment. The tube is attached to baseplate per Example 1 description.

There are two rod cartridge heaters (Watlow Cartridge #J8AX636B, V-240, W-1500) in the baseplate with thermocouple (ThermoElectric #JJ 18 U-304-00-12-0-0-1) centrally placed between those heaters. Three band heaters, (Watlow #MB2N2JE1A, V-208, W-650), were placed along the length of the cylinder with thermocouples. These arrangements of heaters constitutes the four zones of "thermal management". The pressure application was as described in Example 1.

The mold was coated with mold release agent following common practice. Nominally 400 grams of the resin disks were loaded into the molding tube. No Kapton® film was used. The top of the mold was closed by the ram.

All heaters were energized at the same time. The set point for the temperature controllers were at 658° F. (348° C.). The mold was initially pressurized to 800 psi (5.5 MPa). The heat-up period was 30 minutes. At this point the pressure was increased to 3200 psi (22 MPa). The material and mold were held at 658° F. (348° C.)

and 3200 psi (22 MPa) for 60 minutes to reach thermal equilibrium.

During cooldown, the power to the base was reduced (through the controller) by ramp cooling cycle such that it started to cool at 5° F./minute (2.8° C./minute), maintaining 658° F. (348° C.) at the other heating zones. After 30 minutes, the temperature of the base was 500° F., (260° C.). At this time the power for the zone adjacent to the base entered ramped cooling so that this section cooled at 5° F./minute (2.8° C./minute) . Thus, the base and first adjacent zone were cooling at 5° F./minute (2.8° C./minute) whereas the remaining zones were maintained at 658° F. (348° C.). After an additional 30 minutes power input to the second zone adjacent to the base entered ramped cooling to cool at 5° F./minute (2.8° C./minute). When this zone reached 500° F., the third adjacent zone to the baseplate entered ramped cooling cycle to cool at 5° F./minute (2°-8° C./minute). For all four thermal management zones, ramped cooling proceed until 150° F. (65° C.) was achieved. At this point, the rod of neat resin was pushed out of the mold.

The rod was then tested for visual integrity and density. The rod was examined via x-ray technique using DuPont NDT 55 film, 100 Kv, 1.0 ma at 140 records exposure time. No cracks or voids were visible.

EXAMPLE 5

Same material as Example 3 used. All mold hardware identical as Example 3.

During cooldown, the power to the baseplate and three band heaters were turned off after the 60 ninutes hold at 658° F. (348° C.) and 3200 psi (22 mPa). The mold assembly was allowed to cool by direct convection and conduction with room air. Pressure during cooling was maintained at 3200 psi.

The rod was then tested for visual integrity and density. The rod was examined via x-ray technique as in Example 4. Axially located centerline cracks in the material were visible upon inspection of the film.

EXAMPLE 6

A billet, 2.25" (57 mm) in diameter and nominally 6" (152 mm) tall, comprised of fluoropolymer resin and carbon fiber, as described by Mansure in U.S. Pat. No. 4,163,742, was molded without thermal management, and was determined by x-ray analysis to contain radially located cracks throughout the length of the billet. The billet was subsequently reduced in outside diameter by machining to 1.4375" (36.5 mm). This size allowed ready insertion into the mold tube as described in Example 1.

This molding charge, consisting of the machined billet, was processed as described in Example 1, using zoned thermal management for cooling.

The rod was then tested for visual integrity and density. The rod was examined via x-ray technique. No cracks or voids were visible.

EXAMPLE 7

A mixture of 20% (by weight) carbon fiber (¼" long) and fluoropolymer pellets (Teflon ® PFA by ]DuPont) are used to prepare a prepreg.

These prepregs were cut into 3'×3' (90 cm×90 cm) square pieces. Eight layers of these pieces were laid in alternate directions (machine/cross directions) and were consolidated into sheets of thickness 0.100" (2.5 mm) through a press at 650° F. (343° C.) and 350 psi (2500 KPa) pressure for 20 minutes. Circular disks with diameter 1.480" (37.5 mm) were cut out of these sheets for placing in a mold.

The main part of the mold is a right circular hollow cylinder with an ID of 1.500" (38.1 mm), OD of 3" (76 mm) and 10" (25 cm) long. Preferred material of construction of the mold is AISI type H13 tool steel. The cylinder is attached to the groove of a 1" (25 mm) thick (20 cm×20 cm) square metal plate (base plate) through collar and pin arrangement.

There are two rod cartridge heaters (Warlow Cartridge #18A60-NC14, V-240, W-1000) in the base plate with a thermocouple (ThermoElectric P/N JJ18U-304-00-12-0-0 L) centrally placed between those heaters. Three band heaters (Watlow Thin-band #STB2N2J2-C143, V-240, W-650) were placed along the length of the cylinder with thermocouples. We had four "thermal management sections" in this mold. This assembly was now placed on top a press-table. The press (Enerpac, model #RR-1010 and PEM3405D) is capable of delivering up to 10,000 psi (70 MPa) line pressure under controlled conditions. The heaters and the thermocouples from each section were connected to their respective controllers (Microstar model #828-D00-101-101-120-66).

The mold was coated with mold release agent following common practice. A circular piece of Kapton ® film (by DuPont) was placed in the mold cavity first. Then enough disks (400±5 gm) to make 6" (15 cm) long rod were placed into the mold cavity (making sure all the chips are laying flat). A circular piece of Kapton ® film was placed on top of the last disk. The top of the mold was closed by the ram.

All the heaters were turned on at the same time. The set point at all the controllers were at 660° F. (349° C). The mold was pressurized to 9000 psi (63 MPa). The heat-up period was 30 minutes. When the average mold temperature reached ~640° F., the pressure was reduced to ~100 psi (minimum stable pressure). The material and the mold were held at that pressure and 660° F. for 30 minutes to reach thermal equilibrium.

During cooldown, the pressure was increased to ~9000 psi. All the power to the heater bands and the cartridge heaters (ambient cooling). When the average temperature of the mold reached 400° F. (~200° C.) the pressure was reduced to ~100 psi. After the mold reached a temperature of 90° F. (32° C.), the composite rod was pushed out of the mold.

The rod was then tested for visual integrity and density (2.07 gm/cc). Test rods were cut into two parts along the vertical axis. The cut surfaces were polished following standard procedure of optical microscopy. No cracks/voids were visible upon examination at 25X using an optical microscope.

EXAMPLE 8

Similar molding experiment as above was carried out with composites made from PEKK resin (material described in example 3). In this case, the theoretical maximum density was 1.42 gm/cc and actual density was 1.41 gm/cc.

EXAMPLE 9

Same equipment and material as example 7 was used. Here the pressure was held constant at 9000 psi throughout the consolidation process (melting, processing and cool-down). The disk failed to consolidate.

Upon cool-down and release of the pressure, most of the discs came out of the mold (not as a rod).

EXAMPLE 10

Same equipment and material as example 7 was used. Here the high pressure during consolidation was ~800 psi (instead of 9000 psi). The molded rod was full of cracks. The bulk density of the rod was ~1.8 gm/cc where as theoretically the density should be ~2.08 gm/cc. Dissection of the rod radial revealed macro cracks (visible in naked eye).

EXAMPLE 11

A mixture of 20% (by weight) carbon fiber (¼" long) and fluoropolymer pellets (Teflon® PFA by DuPont) are used to prepare a prepreg.

These prepregs were cut into 3'×3' (90 cm×90 cm) square pieces. Eight layers of these pieces were laid in alternate directions (machine/cross directions) and were consolidated into sheets of thickness 0.100" (2.5 mm) through a press at 650° F. (343"C) and 350 psi (2500 KPa) pressure for 20 minutes. Circular disks with diameter 1.480" (37.5 mm) were cut out of these sheets for placing in a mold.

The main part of the mold is a right circular hollow cylinder with an ID of 1.500" (38.1 mm), OD of 3" (76 mm) and 18" (455 mm) long. Preferred material of construction of the mold is AISI type H13 tool steel. The cylinder is attached to the groove of a 1" (25 mm) thick (20 cm×20 cm) square metal plate (base plate) through collar and pin arrangement.

There are two rod cartridge heaters (Watlow Cartridge #18A60-NC14, V-240, W-1000) in the base plate with a thermocouple (ThermoElectric P/N JJ18U-304-00-12-0-0 L) centrally placed between those heaters. Six band heaters (Watlow Thin-band #STB2N2J2-C143, V-240, W-650) were placed along the length of the cylinder with thermocouples. We had seven "thermal management sections" in this mold. This assembly was now placed on top a press-table. The press (Enerpac, model #RR-1010 and PEM3405D) is capable of delivering up to 10,000 psi (70 MPa) line pressure under controlled conditions. The heaters and the thermocouples from each section were connected to their respective controllers (Microstar model #828-D00-101-101-120-66).

The mold was coated with mold release agent following common practice. A circular piece of Kapton® film (by DuPont) was placed in the mold cavity first. Then enough disks (800±5 gm) to make 12" (30 cm) long rod were placed into the mold cavity (making sure all the chips are laying flat). A circular piece of Kapton® film was placed on top of the last disk. The top of the mold was closed by the ram.

All the heaters were turned on at the same time. The set point at all the controllers were at 660° F. (349° C.). The mold was pressurized to 9000 psi (63 MPa). The heat-up period was 30 minutes. When the average mold temperature reached ~640° F., the pressure was reduced to 100 psi (minimum stable pressure). The material and the mold were held at that pressure and 660° F. for 30 minutes to reach thermal equilibrium.

During cooldown, the pressure was increased to 9000 psi. The bottom cartridge heaters were turned off. When the temperature of the base plate became 500° F. (260° C.), the bottom band heaters were turned off. After about 30 minutes, when the bottom mold zone temperature was 500° F., the next zone was turned off. When the second zone temperature became 500° F., all the power to the heater bands and the cartridge heaters (ambient cooling). When the maximum temperature of the mold reached 400° F. (200° C.), the pressure was reduced to 100 psi. After the mold reached a temperature of 90° F. (32° C.), the composite rod was pushed out of the mold.

The rod was then tested for visual integrity and density (2.07 gm/cc). Test rods were cut into two parts along the vertical axis. The cut surfaces were polished following standard procedure of optical microscopy. No cracks/voids were visible upon examination at 25X using an optical microscope.

EXAMPLE 12

Same equipment and material as example 11 but the process of example 7 was used (no zone cooling). The density was 2.03 gm/cc (unacceptable) and non-uniform along the axis of the rod. However, there were no visible cracks.

EXAMPLE 13

A mixture of 20% (by weight) carbon fiber (¼" long) and fluoropolymer pellets (Teflon® PFA by DuPont) are used to prepare a prepreg.

The main part of the mold is a 12"×12"×14" (deep) hollow rectangular tube with 1.5" wall thickness. Heating and cooling zones on the mold wall are created by imbedding alternate cartridge heaters (Watlow Cartridge #J8A60-NC14, V-240, W-1000) and cooling channels in the wall. The cartridge heaters are placed 2" apart and the cooling channels are placed centrally between two cartridge heaters. On each wall, there are five heating zones and four interspersed cooling zones. Cooling channels at the same level on the four walls are connected to a water supply and air supply lines. The ram of the mold is comprised of a 12"×12"×2" thick plate connected to a 10" diameter steel tube, which in turn is connected to the press platens. Three band heaters (Watlow Thinband C/N STB9J2A1-C14, V-240, W-1800) are connected to the steel tube to make a heating zone. The baseplate of the mold has four cartridge heaters to comprise a heating zone. It is placed on top of a heated platen with a cooling channel which is connected to the air and water supply. Thus the mold has seven heating zones (one in the base plate, one in the ram and five in the mold walls) and five forced (air/water) cooling zones. The ram is allowed to cool ambiently.

The mold was coated with a mold release agent following common practice. A rectangular piece of Kapton® film by DuPont was placed in the mold cavity first. Then enough prepreg (15000 gm) to make 3" (75 mm) thick block was placed into the mold cavity. A rectangular piece of Kapton® film was placed on top of the last disk. The top of the mold was closed by the male part of the tool.

All the heaters were turned on at the same time. The set point at all the controllers were at (482° F.). The mold was pressurized to 5000 psi (35 MPa). When all the zones reached 200° C., the set points of all the zones were increased to 350° C. (662° F.). The heat up period was 2 hours. As the average mold temperature reached 310° C. (590° F.), we reduced the pressure to 200 psi (1400 KPa). We held the material and the mold at the temperature for 2 hours for thermal equilibriums. After that point the pressure was raised back to 5000 psi (35 MPa).

During cool down, the power to base was turned off and air was forced through the cooling channels of the baseplate. After 1 hour, the power was turned off from the first zone adjacent the base. Air was turned on through the adjacent cooling channel. After one more hour, the second heating zone (on the mold) was turned off and air was circulated through the adjacent cooling channel. As soon as each cooling zone reached 200° C. (392° F.), air through the channel was turned off and water was turned on to enhance cooling. This process was continued till the power from the fifth heating zone and the ram was turned off. When the ram temperature reached 200° C., the pressure was reduced to ~80 psi. After the mold reached a temperature of 30° C. (86° F.), the composite block was pushed out of the mold.

The disk was then tested for visual integrity and density. Test disks were cut into two parts along the vertical axis. The cut surfaces were polished following standard procedure of optical microscopy. No cracks/voids were visible upon examination at 25X using an optical microscope.

The theoretical density of these disks are 2.08 gm/cc. Following ASTM D792 procedure, the density of the specimen was found to be 2,065 gm/cc. This value was within the expected error and variation range for a defect-free composite.

What is claimed is:

1. A compression molding process for a molded article of fiber reinforced thermoplastic resin material, said molded article to be formed in the cavity of an open top mold shaped to conform to said article, said mold having a plurality of zones capable of being individually heated arranged from one end to the opposite end of the mold and means to apply pressure from said one end of the mold to material in said mold, said fiber having a higher melting point than said thermoplastic resin material, said process comprising: filling the cavity of said mold with said fiber reinforced resin material; heating each of said zones to a first temperature sufficient to melt said thermoplastic resin but insufficient to degrade said resin; consolidating said material in said mold by applying a predetermined pressure thereto; reducing the predetermined pressure in said mold to second predetermined pressure while maintaining said first temperature in each of said zones for a predetermined period of time until thermal equilibrium is reached; then stopping the heating step in each of said zones while raising said second predetermined pressure to said predetermined pressure to solidify said resin in each of said zones; and removing said article from said mold.

2. The process as defined in claim 1 wherein said resin is a fluoropolymer resin and said fiber is carbon fiber.

3. A compression molding process for a molded article of thermoplastic resin material, said molded article to be formed in the cavity of an open top mold shaped to conform to said article, said mold having a plurality of zones capable of being individually heated arranged from one end to the opposite end of the mold and means to apply pressure from said one end of the mold to material in said mold, said process comprising: filling the cavity of said mold with said thermoplastic resin material; heating each of said zones to a first temperature sufficient to melt said thermoplastic resin but insufficient to degrade said resin; consolidating said material in said mold by applying a predetermined pressure thereto; reducing the predetermined pressure in said mold to a second predetermined pressure while maintaining said first temperature in each of said zones for a predetermined period of time until thermal equilibrium is reached; then stopping the heating in each of said zones while raising said second predetermined pressure to said predetermined pressure to solidify said resin in each of said zones; and removing said article from said mold.

4. The process as defined in claim 3 wherein said resin is a fluoropolymer resin.

* * * * *